US012671822B2

(12) United States Patent
Zou

(10) Patent No.: US 12,671,822 B2
(45) Date of Patent: Jun. 30, 2026

(54) INTRA-FRAME, INTER-FRAME PREDICTION AND COMBINED INTER-INTRA PREDICTION MODE, VIDEO CODING METHOD AND APPARATUS

(71) Applicant: BEIJING BAIDU NETCOM SCIENCE TECHNOLOGY CO., LTD., Beijing (CN)

(72) Inventor: Jian Zou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/747,121

(22) Filed: Jun. 18, 2024

(65) Prior Publication Data

US 2025/0301151 A1     Sep. 25, 2025

(30) Foreign Application Priority Data

Mar. 20, 2024     (CN) .......................... 202410324028.4

(51) Int. Cl.
*H04N 19/159*     (2014.01)
*H04N 19/147*     (2014.01)
*H04N 19/176*     (2014.01)
(52) U.S. Cl.
CPC ......... *H04N 19/159* (2014.11); *H04N 19/147* (2014.11); *H04N 19/176* (2014.11)
(58) Field of Classification Search
CPC .. H04N 19/159; H04N 19/147; H04N 19/176; H04N 19/52
See application file for complete search history.

(56) References Cited

U.S. PATENT DOCUMENTS 8,566,515 B2 * 10/2013 Rubinstein ............. G11C 19/00
                                                          345/24
8,660,193 B2 * 2/2014 Rubinstein .......... G06F 15/8015
                                                          375/240.26
(Continued)

OTHER PUBLICATIONS

Senay Negusse "Improving Intra Pixel prediction for H.264 video coding"; Blekinge Institute of Technology, May 2008 (Year: 2008).*
(Continued)

*Primary Examiner* — Dramos Kalapodas
(74) *Attorney, Agent, or Firm* — Leydig, Voit & Mayer, Ltd.

(57)                ABSTRACT

A method for determining a prediction mode in video coding are provided. A method comprises: determining picture evaluation information of a to-be-encoded current block and a plurality of picture evaluation information of a plurality of encoded reference blocks; calculating, based on the picture evaluation information determined, the correlation between the current block and each of the plurality of reference blocks, respectively, and determining a target reference block in the plurality of reference blocks; performing a prediction search based on a first intra prediction mode of the target reference block, and determining a second intra prediction mode corresponding to the current block. This second intra prediction mode may then be compared with an inter prediction mode to select a final prediction mode for encoding the current block. Based on the final prediction mode, the current block is encoded, and subsequently, the encoded current blocks are stitched to obtain a complete frame.

14 Claims, 4 Drawing Sheets

(56) References Cited

U.S. PATENT DOCUMENTS

| | | | | | |
|---|---|---|---|---|---|
| 9,615,085 | B2 * | 4/2017 | Wang | .................... | H04N 19/176 |
| 2020/0029080 | A1 * | 1/2020 | Kim | ...................... | H04N 19/136 |
| 2023/0336718 | A1 * | 10/2023 | Lee | ........................ | H04N 19/11 |
| 2024/0244191 | A1 * | 7/2024 | Zhang | .................... | H04N 19/11 |
| 2024/0430403 | A1 * | 12/2024 | Lin | ...................... | H04N 19/119 |
| 2025/0008105 | A1 * | 1/2025 | Lin | ...................... | H04N 19/172 |
| 2025/0080754 | A1 * | 3/2025 | Choi | .................... | H04N 19/105 |

OTHER PUBLICATIONS

Edward Jaja et al., (hereinafter Jaja) "Intra-Block Prediction Using First-Second Row Non-directional Samples in HEVC Video Coding"; 2017 © IEEE ICSIPA 2017, Malaysia Sep. 12-14, 2017 (Year: 2017).*

* cited by examiner

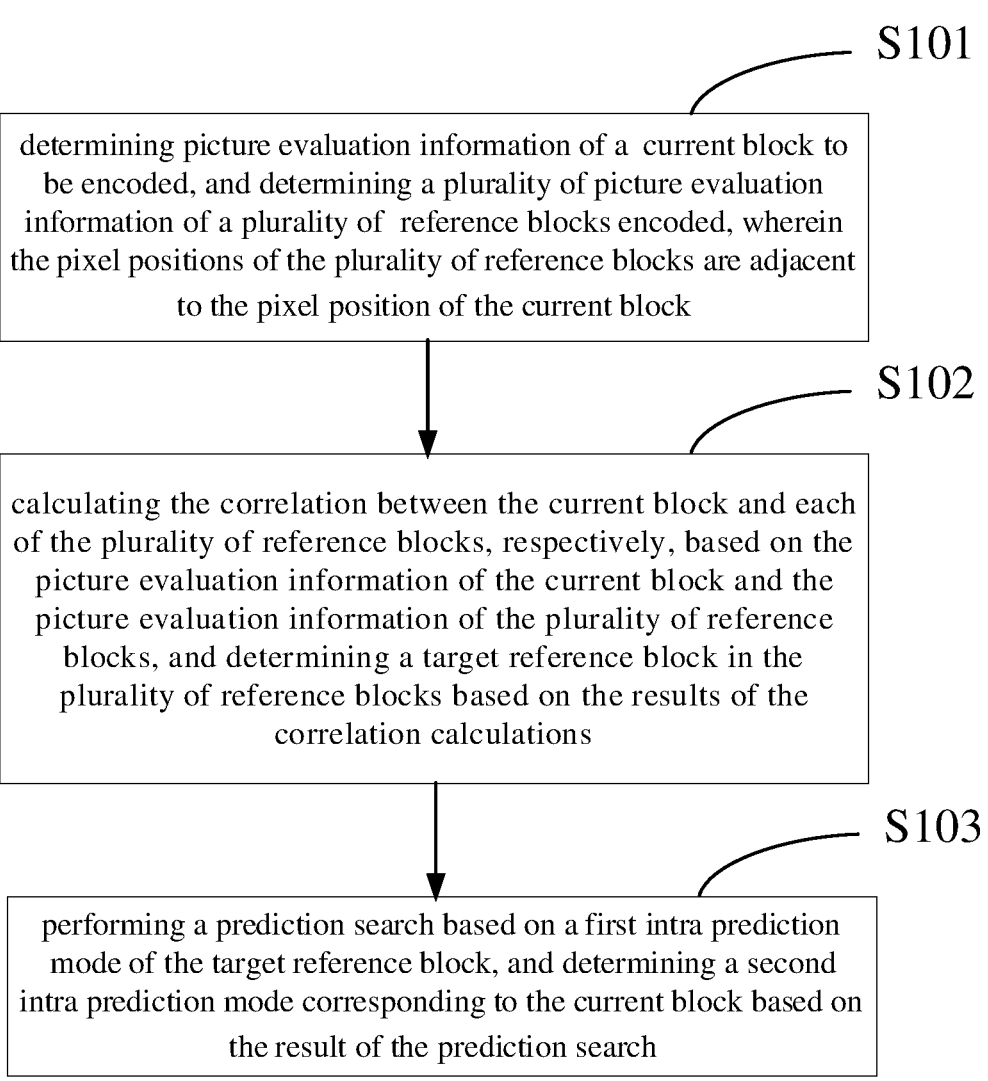

S101 determining picture evaluation information of a current block to be encoded, and determining a plurality of picture evaluation information of a plurality of reference blocks encoded, wherein the pixel positions of the plurality of reference blocks are adjacent to the pixel position of the current block

S102 calculating the correlation between the current block and each of the plurality of reference blocks, respectively, based on the picture evaluation information of the current block and the picture evaluation information of the plurality of reference blocks, and determining a target reference block in the plurality of reference blocks based on the results of the correlation calculations

S103 performing a prediction search based on a first intra prediction mode of the target reference block, and determining a second intra prediction mode corresponding to the current block based on the result of the prediction search

FIG. 1

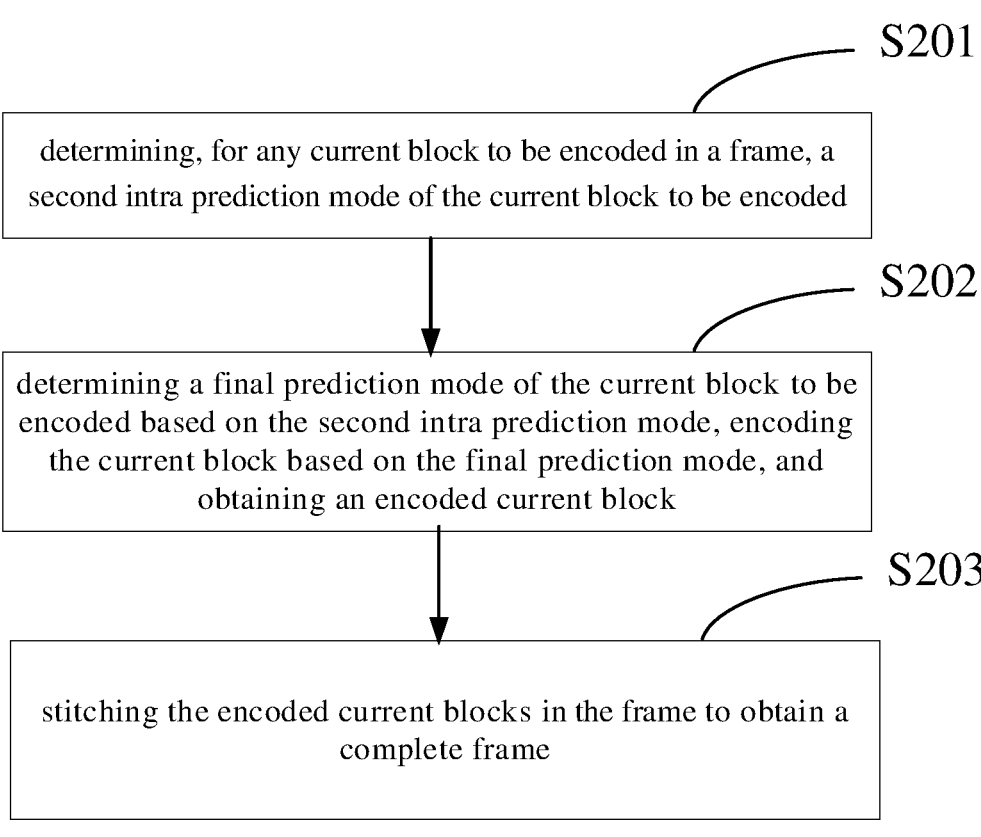

S201 determining, for any current block to be encoded in a frame, a second intra prediction mode of the current block to be encoded

S202 determining a final prediction mode of the current block to be encoded based on the second intra prediction mode, encoding the current block based on the final prediction mode, and obtaining an encoded current block

S203 stitching the encoded current blocks in the frame to obtain a complete frame

FIG. 3

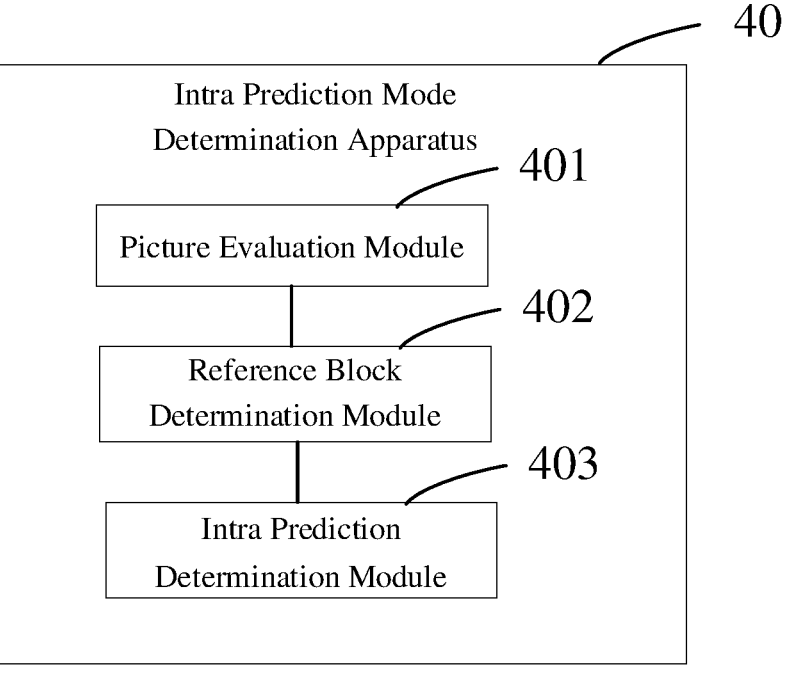

40

Intra Prediction Mode
Determination Apparatus

401

Picture Evaluation Module

402

Reference Block
Determination Module

403

Intra Prediction
Determination Module

FIG. 4

INTRA-FRAME, INTER-FRAME PREDICTION AND COMBINED INTER-INTRA PREDICTION MODE, VIDEO CODING METHOD AND APPARATUS

CROSS-REFERENCE TO RELATED APPLICATIONS

This application claims priority to Chinese Patent Application No. 202410324028.4, filed on Mar. 20, 2024, which is hereby incorporated by reference in its entirety.

TECHNICAL FIELD

The present disclosure relates to the technical field of video coding, and in particular to the technical field of intra prediction.

BACKGROUND

One purpose of video coding and decoding may be to reduce redundancy in the input video signal by compression. Compression may facilitate to reduce the bandwidth and/or storage space requirements described above, and in some cases, two or more orders of magnitude may be reduced. Lossless compression and lossy compression, as well as combinations thereof, may be used in video coding and decoding. The video encoder and decoder may use several major techniques including, for example, prediction, transformation, quantization, loop filtering, and entropy coding. Among them, the prediction is an important module of the encoder, and is divided into intra prediction and inter prediction. Intra prediction refers to the prediction of a pixel block to be encoded in a certain way by using reconstructed pixel values of encoded pixel blocks in the same frame of the picture. Inter prediction refers to the prediction of a pixel block to be encoded by using a pixel block in an encoded preceding or following reference frame.

For intra prediction, generally, in different video coding compression standards, there are a plurality of intra prediction modes with different intra prediction modes correspond to different pixel processing rules, and in order to select an optimal intra prediction mode from the plurality of intra prediction modes for a pixel block to be encoded, prediction directions of all the intra prediction modes need to be calculated to select the optimal result, which consumes a large amount of computing power and takes a long time.

SUMMARY OF THE PRESENT INVENTION

The present disclosure provides a method for determining an intra prediction mode, a video coding method, and an apparatus for solving at least one of the above technical issues.

According to an aspect of the present disclosure, there is provided a method for determining an intra prediction mode, wherein the method comprises:

determining picture evaluation information of a current block to be encoded, and determining a plurality of picture evaluation information in one-to-one correspondence with a plurality of reference blocks encoded, wherein the pixel positions of the plurality of reference blocks are adjacent to the pixel position of the current block;

calculating, based on the picture evaluation information of the current block and the picture evaluation information of the plurality of reference blocks, the correlation between the current block and each of the plurality of reference blocks respectively, and determining a target reference block in the plurality of reference blocks based on the results of the correlation calculations;

performing a prediction search based on a first intra prediction mode of the target reference block, and determining a second intra prediction mode corresponding to the current block based on the result of the prediction search.

According to another aspect of the present disclosure, there is provided a video coding method, wherein the method comprises:

determining, for any current block to be encoded in a frame, a second intra prediction mode of the current block to be encoded;

determining a final prediction mode of the current block to be encoded based on the second intra prediction mode, encoding the current block based on the final prediction mode, and obtaining an current block encoded;

stitching the current blocks encoded in the frame to obtain a complete picture;

wherein the second intra prediction mode of the current block to be encoded is determined by the following steps:

determining picture evaluation information of a the current block to be encoded, and determining a plurality of picture evaluation information in one-to-one correspondence with a plurality of reference blocks encoded, wherein the pixel positions of the plurality of reference blocks are adjacent to the pixel position of the current block;

calculating, based on the picture evaluation information of the current block and the picture evaluation information of the plurality of reference blocks, the correlation between the current block and each of the plurality of reference blocks respectively, and determining a target reference block in the plurality of reference blocks based on the results of the correlation calculations;

performing a prediction search based on a first intra prediction mode of the target reference block, and determining a second intra prediction mode corresponding to the current block based on the result of the prediction search.

According to another aspect of the present disclosure, there is provided an electronic device, comprising:

at least one processor; and a memory communicatively connected to the at least one processor; wherein the memory stores instructions executable by the at least one processor, and the instructions are executed by the at least one processor to enable the at least one processor to execute the following steps:

determining picture evaluation information of a current block to be encoded, and determining a plurality of picture evaluation information in one-to-one correspondence with a plurality of reference blocks encoded, wherein the pixel positions of the plurality of reference blocks are adjacent to the pixel position of the current block;

calculating, based on the picture evaluation information of the current block and the picture evaluation information of the plurality of reference blocks, the correlation between the current block and each of the plurality of reference blocks respectively, and determining a target reference block in the plurality of reference blocks based on the results of the correlation calculations;

performing a prediction search based on a first intra prediction mode of the target reference block, and determining a second intra prediction mode corresponding to the current block based on the result of the prediction search.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

The drawings are used to better understand the present solution and do not constitute a limitation to the present disclosure. Wherein:

FIG. 1 illustrates a flowchart schematic diagram of a method for determining an intra prediction mode according to a first embodiment of the present disclosure;

FIG. 3 illustrates a flowchart schematic diagram of a video coding method according to a second embodiment of the present disclosure;

FIG. 4 illustrates a structural schematic diagram of an apparatus for determining an intra prediction mode according to a third embodiment of the present disclosure;

DETAILED DESCRIPTION OF THE EMBODIMENTS

Figure 2:
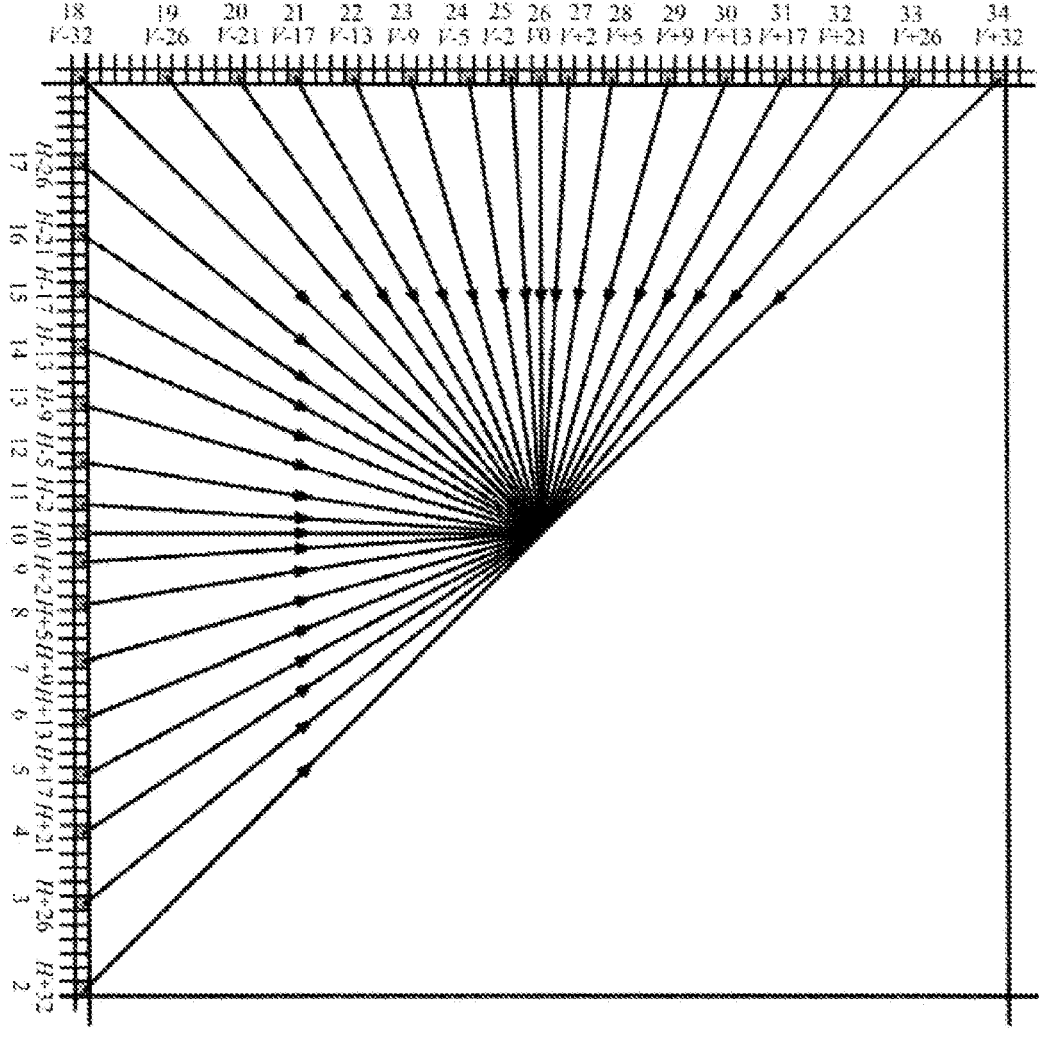
FIG. 2 illustrates a schematic diagram of multi-directional intra prediction modes in the HEVC standard.

The embodiments of the present disclosure are described below in conjunction with the accompanying drawings, which include various details of the embodiments of the present disclosure to facilitate understanding and should be considered as an example only. Therefore, one of the ordinary skills in the art will recognize that various changes and modifications may be made to the embodiments described herein without departing from the scope of the present disclosure. Similarly, descriptions of well-known functions and structures are omitted in the following description for the purpose of clarity and conciseness.

In the case of no conflict, the embodiments of the present disclosure and the features in the embodiments may be combined with each other.

As used herein, the term "and/or" includes any and all combinations of one or more related listed items.

The terminology used herein is for the purpose of describing particular embodiments only and is not intended to limit the present disclosure. As used herein, the singular forms "a" and "the" are intended to include the plural forms as well, unless the context clearly indicates otherwise.

Unless otherwise defined, all terms (including technical and scientific terms) used herein have the same meaning as commonly understood by one of ordinary skill in the art. It will also be understood that terms such as those defined in commonly used dictionaries should be interpreted as having a meaning that is consistent with their meaning in the context of the relevant art and the present disclosure, and will not be interpreted as having an idealized or overly formalized meaning unless expressly so defined herein.

The method for determining an intra prediction mode according to the present disclosure may be executed by an electronic device such as a terminal device or a server, and the terminal device may be an in-vehicle device, a user equipment (UE), a mobile device, a user terminal, a terminal, a cellular phone, a cordless phone, a personal digital assistant (PDA), a handheld device, a computing device, a vehicle-mounted device, a wearable device, or the like, and the method may be implemented by a processor invoking computer-readable program instructions stored in a memory. Alternatively, the method for determining an intra prediction mode provided by the present disclosure may be executed by a server.

For ease of understanding, some technical terms are explained below.

Intra prediction, which refers to the prediction of a pixel block to be encoded in a certain manner using reconstructed pixel values of pixel blocks encoded in the same frame of a picture.

Inter prediction, which refers to the prediction of a pixel block to be encoded using a pixel block in an encoded preceding or following reference frame.

Picture Types:

An intra-coded frame, (I-frame), which may be a picture that can be encoded and decoded without using any other picture in the sequence as the prediction source. Some video codecs allow different types of intra-coded frames, including, for example, Independent Decoder Refresh (IDR) frames. Those skilled in the art will appreciate variations of I-frames and the corresponding applications and features thereof.

A predictive-coded frame (P-frame), which may be a frame that can be coded and decoded using intra prediction or inter prediction, and the intra prediction or inter prediction uses at most one motion vector and a reference index to predict the sample value of each block.

A bidirectional predictive-coded frame (B-frame), which may be a frame that can be coded and decoded using intra prediction or inter prediction, and the intra prediction or inter prediction uses at most two motion vectors and a reference index to predict the sample value of each block. Similarly, multi-directional predictive-coded frame may use more than two reference frames and associated metadata to reconstruct a single block.

In a first embodiment of the disclosure, referring to FIG. 1, which illustrates a schematic flowchart of a method for determining an intra prediction mode according to a first embodiment of the present disclosure, the method comprises:

S101, determining picture evaluation information of a current block to be encoded, and determining a plurality of picture evaluation information of a plurality of reference blocks encoded, wherein the pixel positions of the plurality of reference blocks are adjacent to the pixel position of the current block;

S102, calculating, based on the picture evaluation information of the current block and the picture evaluation information of the plurality of reference blocks, the correlation between the current block and each of the plurality of reference blocks respectively, and determining a target reference block in the plurality of reference blocks based on the results of the correlation calculations;

S103, performing a prediction search based on a first intra prediction mode of the target reference block, and determining a second intra prediction mode corresponding to the current block based on the result of the prediction search.

A source image (i.e., an image of original pixels) may generally be spatially subdivided into a plurality of pixel blocks (e.g., each block having 4×4, 8×8, 4×8, or 16×16 pixels) and encoded block by block. These blocks may be encoded predictively with reference to other (encoded) blocks, and the other blocks are determined based on an encoding assignment, which is applied to the blocks, of the corresponding frame. For example, a block of an I-frame may be encoded non-predictively, or the block may be encoded predictively (spatial prediction or intra prediction) with reference to encoded blocks of the same frame. A pixel block of a P-frame may be encoded predictively by spatial prediction or by temporal prediction with reference to one previously encoded reference frame. A block of a B-frame may be encoded predictively by spatial prediction or by temporal prediction with reference to one or two previously encoded reference frames.

In this specification, a "block" in a "current block" and "reference block" refers to a pixel block, and the current block refers to a pixel block that is currently being processed and un-encoded; the reference block refers to a processed and encoded pixel block.

It should be noted that the methods provided in the present disclosure may be applied to an intra prediction process of any type of I-frame, P-frame, and B-frame, and are not limited herein.

It should be noted that the methods provided in the present disclosure may be applied in various video coding and compression standards, such as the HEVC standard, the H.264 standard, the VCC standard, and the like, without limitation herein. For ease of understanding, the HEVC standard is taken as an example for description.

The intra prediction technique of HEVC standards introduces more prediction modes (total of 35), including Planar prediction (Planar) and Direct prediction (DC), etc., which makes the prediction more accurate, thereby reducing the size of the residual. In addition, the HEVC introduces a more flexible partitioning structure, which allows different sizes of prediction pixel blocks to be used within a coding tree unit (CTU), and the sizes of the prediction pixel blocks may vary from 4×4 to 64×64, which further improves the accuracy of the prediction.

Referring to FIG. 2, FIG. 2 illustrates a schematic diagram of a multi-directional intra prediction mode in the HEVC standard. The 33 possible prediction directions (predictor-direction) in the HEVC standard are included in this figure, as indicated by the number 2-34, each prediction direction corresponds to an intra prediction mode, and two intra prediction modes, the Planar prediction and the direct DC prediction, are also included; and reference pixel processing rules (including computation rules of prediction pixels). The convergence point of all arrows indicates the current block being processed and to be encoded, and the arrow indicates the direction of the prediction for the current block, and determining an optimal prediction direction for the current block is to determine an optimal intra prediction mode (i.e., a second intra prediction mode).

In the related art, in order to select an optimal intra prediction direction mode for each current block to be encoded, intra prediction modes of all prediction directions are calculated before the optimum can be compared, which consumes a large amount of computing power and time. By the way of the present disclosure, the correlations between the reference blocks and the current block is first evaluated based on the picture evaluation information of the current block and picture evaluation information of a plurality of reference blocks, and a preliminary prediction direction (i.e., the prediction direction corresponding to the first intra prediction mode) is quickly determined based on the intra prediction mode (i.e., the first intra prediction mode) of the reference block with the highest correlation, and then the prediction search is performed again based on the determined preliminary prediction direction to obtain a final intra prediction mode (i.e., the second intra prediction mode) of the current block and the prediction direction thereof (i.e., the prediction direction corresponding to the second intra prediction mode), whereby the method provided in the present disclosure greatly reduces the amount of calculations for determining an intra prediction mode and reduces the time spent, by quickly determining a preliminary prediction direction and then conducting a fine search to determine the final prediction mode, as compared to calculating all directions.

It should be noted that the picture evaluation information is information that represents characteristics of a picture, such as: gradient evaluation information (i.e., the gradient information of the picture), chromaticity evaluation information (the information related to the chromaticity of the picture), luminance evaluation information (the information related to the luminance of the picture), etc., which are not limited here, and for ease of description, taking the example of the gradient evaluation information (the information related to the gradient of the picture) as the picture evaluation information.

It is to be noted that the number of reference blocks is not defined and may be defined as required, and the number and positions of the reference blocks determine the range of correlation calculation. The range of correlation calculation may be determined by increasing or decreasing the number of reference blocks and by selecting the positions of the reference blocks. For example, the number of the plurality of reference blocks is four. Accordingly, the positional relationships between the reference blocks and the current block are not defined. For example, the pixel positions of the plurality of reference blocks are adjacent to the pixel position of the current block, including: the four reference blocks are located at the left, the top, the left-top, and the right-top of the current block, respectively. The pixel position is the spatial location of the current block or the reference block in the frame.

For S101, in some examples, in S101, determining the picture evaluation information of the current block to be encoded comprises:

Step A. calculating single-frame gradient information of the current block in each of the multiple frames, respectively, and generating a set as the gradient evaluation information of the current block based on the single-frame gradient information of the current block corresponding to the multiple frames.

Specifically, obtaining the first N frames, with N being an integer greater than or equal to 1, and calculating the gradient information of the current block in each of the frames, respectively, the gradient information is referred to as the single-frame gradient information; and then generating the single-frame gradient information of the current block corresponding to each of the first N frames as a set, which is taken as the gradient evaluation information of the current block. In other words, the gradient evaluation information is a set comprising of a plurality of elements with each element being the single-frame gradient information of the current block of one of the preceding N frames, denoted for example as X:[s1, s2 . . . sN], wherein X is the set of gradient evaluation information of the current blocks, and s1-sN are the single-frame gradient information of the current block of each of the preceding N frames.

Determining, in S101, the plurality of picture evaluation information of the plurality of encoded reference blocks comprises:

Step B, for any reference block in the plurality of reference blocks, calculating single-frame gradient information of the reference block in each of the multiple frames, respectively, and generating a set as the gradient evaluation information of the reference block based on the single-frame gradient information of a plurality of reference blocks corresponding to the multiple frames.

Specifically, the number of the reference blocks may be a plural, and for each of the plurality of reference blocks, the gradient evaluation information corresponding to each reference block is determined in the manner of step B. For any reference block, obtaining the first M frames, with M being an integer greater than or equal to 1, and calculating the gradient information of the reference block in each of the frames, respectively, the gradient information is referred to as the single-frame gradient information; and then generating the single-frame gradient information of the reference block corresponding to each of the first M frames as a set, which is taken as the gradient evaluation information of the reference block. In other words, the gradient evaluation information is a set comprising of a plurality of elements with each element being the single-frame gradient information of the reference block of one of the preceding M frames, denoted for example as Y:[p1, p2 . . . pM], wherein Y is the set of gradient evaluation information of the reference blocks, and p1-pM are the single-frame gradient information of the reference block of each of the preceding M frames.

It should be noted that the single-frame gradient information represents the direction and extent of the grayscale change of the pixels of the current block or the reference block, and can be used to represent the picture edges, textures, and contours of the current block or the reference block.

In some examples, step A comprises:

Step A1, for the current block in any frame, determining a first pixel gradient direction and a first pixel gradient modulus value of each of the pixels in the current block;

Step A2, determining a first average gradient direction based on the average direction of the first pixel gradient directions of the pixels, and determining a first average gradient modulus value based on the average value of the first pixel gradient modulus values of the pixels;

Step A3: determining the single-frame gradient information of the current block based on the first average gradient direction and the first average gradient modulus value.

In the method provided in the present disclosure, the single-frame gradient information of the current block may be determined based on a pixel-level calculation. That is, the single-frame gradient information of the whole block is determined by introducing the pixel information of individual pixels in the current block. Specifically, the pixel-level gradient information, including the direction of the gradient (referred to as the first pixel gradient direction) and the modulus value of the gradient (referred to as the first pixel gradient modulus value), may be calculated first.

Wherein the direction of the gradient may be used to represent the direction of the picture edge. The modulus value of the gradient may be used to represent the intensity of the picture edge.

In some examples, corresponding to the step A1, for any pixel, the first pixel gradient direction may be calculated as follows:

$$\theta = \arctan(dy/dx) \tag{1}$$

where $\theta$ is the first pixel gradient direction, and dy and dx are the grayscale difference between adjacent pixels of the current pixel in the x direction and the y direction.

In some examples, corresponding to step A1, for any pixel, the first pixel gradient modulus value may be calculated as follows:

$$|\nabla f| = \sqrt{(dx^2 + dy^2)} \tag{2}$$

where $|\nabla f|$ is the first pixel gradient modulus value, and dx and dy are the grayscale difference between adjacent pixels of the current pixel in the x-direction and y-direction.

For step A2, after obtaining the first pixel gradient direction and the first pixel gradient modulus value of each of the pixels, a first average gradient direction is obtained based on the middle angle (i.e., the average direction) of the direction angle of each of the first pixel gradient directions; a first average gradient modulus value is obtained based on the average value of the first pixel gradient modulus values of the pixels; and then, the single-frame gradient information of the current block of the current frame is determined based on the first average gradient direction and the first average gradient modulus value. There are various ways of obtaining the single-frame gradient information, such as directly generating the first average gradient direction and the first average gradient modulus value as a set, or fusing the two into a single value.

In some examples, for the current block in any frame, the step A3 comprises:

Sub-step A31, performing a normalization calculation based on the first average gradient direction and the first average gradient modulus value;

Sub-step A32, performing a weighted calculation based on the normalized first average gradient direction and the normalized first average gradient modulus value to obtain a weighted gradient value as the single-frame gradient information of the current block.

The first average gradient direction and the first average gradient modulus value are normalized so as to unify the magnitude of the two, and then the weighted calculation is performed based on a preset weight (e.g., 50% for each), and the two are fused into the weighted gradient value so as to take the weighted gradient value as the single-frame gradient information of the current block of the current frame. In this way, the amount of data of the single-frame gradient information can be reduced, which facilitates the prediction afterwards.

In some examples, step B comprises:

Step B1, for the reference block in any frame, determining a second pixel gradient direction and a second pixel gradient modulus value of each of pixels in the reference block;

Step B2, determining a second average gradient direction based on the average direction of the second pixel gradient directions of the pixels, and determining a second average gradient modulus value based on the average value of the second pixel gradient modulus values of the pixels;

Step B3: determining the single-frame gradient information of the reference block based on the second average gradient direction and the second average gradient modulus value.

In the method provided in the present disclosure, the single-frame gradient information of the reference block may be determined based on a pixel-level calculation. That is, the single-frame gradient information of the whole block is determined by introducing the pixel information of individual pixels in the reference block. Specifically, the pixel-level gradient information, including the direction of the gradient (referred to as the first pixel gradient direction) and the modulus value of the gradient (referred to as the first pixel gradient modulus value), may be calculated first.

Wherein, the direction of the gradient may be used to represent the direction of the picture edge. The modulus value of the gradient may be used to represent the intensity of the picture edge.

In some examples, in the same manner as the above step A, the second pixel gradient direction is calculated using the formula (1); the second pixel gradient modulus value is calculated using the formula (2).

For step B2, after obtaining the second pixel gradient direction and the second pixel gradient modulus value of each of the pixels, a second average gradient direction is obtained based on the middle angle (i.e., the average direction) of the direction angle of each of the second pixel gradient directions; a second average gradient modulus value is obtained based on the average value of the second pixel gradient modulus values of the pixels; and then, the single-frame gradient information of the reference block of the current frame is determined based on the second average gradient direction and the second average gradient modulus value, and there are various ways of obtaining the single-frame gradient information, such as directly generating the second average gradient direction and the second average gradient modulus value as a set, or fusing the two into a single value.

In some examples, for the reference block in any frame, the step A3 comprises:

Sub-step B31, performing a normalization calculation based on the second average gradient direction and the second average gradient modulus value;

Sub-step B32, performing a weighted calculation based on the normalized second average gradient direction and the normalized second average gradient modulus value to obtain a weighted gradient value as the single-frame gradient information of the reference block.

The second average gradient direction and the second average gradient modulus value are normalized so as to unify the magnitude of the two, and then the weighted calculation is performed based on a preset weight (e.g., 50% for each), and the two are fused into the weighted gradient value so as to take the weighted gradient value as the single-frame gradient information of the reference block of the current frame. In this way, the amount of data of the single-frame gradient information can be reduced, which facilitates the prediction afterwards.

Wherein, in S102, there are various ways to calculate the correlation between the picture evaluation information of the current block and the picture evaluation information of the reference block. For example, by calculating a Pearson correlation coefficient, a Spearman correlation coefficient, a Kendall correlation coefficient and the like between the picture evaluation information of the current block and the picture evaluation information of the reference block. For example, taking the Pearson correlation coefficient as an example:

For S102, in some examples, the S102 comprises:

Step 1, calculating, for any reference block, a Pearson correlation coefficient based on the picture evaluation information of the current block and the picture evaluation information of the reference block;

Step 2: determining the corresponding reference block, with the largest value of Pearson correlation coefficient, as the target reference block.

The Pearson correlation coefficient is a method for measuring the strength of a linear correlation between two variables (the picture evaluation information of one reference block and the picture evaluation information of the current block). Its value can range between 1 and +1, with 0 represents no correlation, negative value represents a negative correlation, and positive value represents a positive correlation. The Pearson correlation coefficient is obtained by calculating the ratio between the covariance of the two variables and the product of their standard deviations. In simple terms, the Pearson correlation coefficient means that the values of the variables are centered, that is, the average value of the elements is subtracted from all dimensions in the two vectors, and the average values of all the dimensions are essentially 0 after centering; and then a cosine distance is calculated for the centered result.

In the above steps 1 and 2, for the plurality of reference blocks, Pearson correlation coefficients between the current block and each of the reference blocks are calculated respectively based on the picture evaluation information (e.g., the gradient evaluation information). The Pearson correlation coefficient is used as the indicator of a correlation, and then the reference block with the highest correlation, that is, with the largest Pearson correlation coefficient, is taken as the target reference block. The purpose of the above steps is to: conduct a preliminary rough search to determine a reference block that is most relevant to the current block, and to use the prediction direction of the reference block as the preliminary prediction direction, thereby reducing the amount of computation for the prediction.

In some examples, the step 1 of S102 comprises: for any reference block,

Sub-step 1, obtaining a covariance based on the picture evaluation information of the current block and the picture evaluation information of the reference block;

Sub-step 2, obtaining a first standard deviation of the current block based on the picture evaluation information of the current block, and obtaining a second standard deviation of the reference block based on the picture evaluation information of the reference block;

Sub-step 3, calculating the Pearson correlation coefficient between the current block and the reference block based on the covariance, the first standard deviation, and the second standard deviation.

The set X of the picture evaluation information of the current block and the set Y of the picture evaluation information of any reference block are taken as an example for description.

For sub-step 1, the covariance cov(X,Y) is determined by the following direction:

$$\text{cov}(X, Y) = \left(\sum_{i=1}^{n} \left((X_i - \overline{X})(Y_i - \overline{Y})\right)\right)/n \qquad (3)$$

where n is the number of picture evaluation information (picture frames); $X_i$ is each element in the set X (the single-frame gradient information of the current block); $Y_i$ is each element in the set Y (the single-frame gradient information of the reference block); $\overline{X}$ is the mean of the picture evaluation information of the current block obtained by elements in the set X; $\overline{Y}$ is the mean of the picture evaluation information of the reference block obtained by elements in the set Y.

For sub-step 3, the Pearson correlation coefficient ρ is determined according to the following direction:

$$\rho = \text{cov}(X, y)/(\sigma_X * \sigma_Y) \qquad (4)$$

where $\sigma_X$ is the first standard deviation and $\sigma_Y$ is the second standard deviation.

For S103, in some examples, the S103 comprises:

Sub-step 1, taking the prediction direction corresponding to the first intra prediction mode of the target reference block as the search reference direction, determining a plurality of intra prediction modes, whose corresponding prediction directions are closest to the search reference direction, as a plurality of candidate intra prediction modes;

Sub-step 2, selecting, from the plurality of candidate intra prediction modes, the candidate intra prediction mode with the lowest rate distortion cost as the second intra prediction mode corresponding to the current block.

The reference block is an encoded pixel block, so the reference block has already determined the intra prediction mode. The target reference block with the highest correlation with the current block is obtained after the calculation of the correlation. The prediction direction corresponding to the first intra prediction mode, which is determined by the target reference block, is determined as the preliminary prediction direction (i.e., the search reference direction), thus the approximate prediction direction is determined without having to perform search in all the prediction directions. Further prediction search is carried out in the vicinity of the search reference direction based on the pixel processing rules (including computation rules for prediction pixels) corresponding to the first intra prediction mode of the target reference block, and the optimal second intra prediction mode of the current block is finally determined.

Specifically, the purpose of sub-step 1 is to first determine a plurality of directions to be finely searched based on the search reference direction. In other words, the plurality of intra prediction modes, whose angles of the prediction directions are closest to the angle of the search reference direction, are determined as the candidate intra prediction modes. Referring to FIG. 2, as an example, the search reference direction is 24, and two candidate intra prediction modes with the closest angles in the forward and reverse directions are determined, respectively: 22, 23 and 25, 26.

Specifically, there are various ways of prediction research in S103, for example, by further comparing the correlations between the reference blocks corresponding to the candidate intra prediction modes and the current block, determining the second intra prediction mode corresponding to the current block based on the goal of having the highest correlation, or determining the second intra prediction mode corresponding to the current block based on the goal of having the minimum rate distortion cost.

In a second embodiment of the disclosure, referring to FIG. 3, which illustrates a flow diagram of a video coding method according to the second embodiment of the disclosure, the method comprises:

S201, determining, for any current block to be encoded in a frame, a second intra prediction mode of the current block to be encoded;

S202, determining a final prediction mode of the current block to be encoded based on the second intra prediction mode, encoding the current block based on the final prediction mode, and obtaining an encoded current block;

encoding each block in the picture based on the S201 and S202 to obtain a plurality of encoded pixel blocks (also referred to as the encoded current block); and S203, stitching the encoded current blocks in the frame to obtain a complete frame.

The second intra prediction mode of the current block to be encoded is determined by the method provided in the above first embodiment.

Each picture of the video is encoded according to the above method to complete the video coding.

In some examples, in S202, determining the final prediction mode of the current block to be encoded based on the second intra prediction mode comprises:

Step 1, determining a inter prediction mode corresponding to the current block to be encoded;

Step 2, determining one of the second intra prediction mode and the inter prediction mode as the final prediction mode of the current block to be encoded by comparing the rate distortion cost of the second intra prediction mode and the inter prediction mode.

It is noted that, in some examples, the video coding uses dual prediction of the inter prediction mode and the intra prediction mode to select the optimal prediction mode as the final prediction mode of the current block. In some examples, it is also possible that only the intra prediction mode is used as the prediction mode of video coding, and then, in S202, determining the final prediction mode of the current block to be encoded based on the second intra prediction mode is: determining the second intra prediction mode as the final prediction mode of the current block to be encoded, which is not limited herein.

In some examples, in S202, encoding the current block based on the final predictive model to obtain the encoded current block comprises:

performing, based on the final prediction model, motion compensation, quantization transformation, entropy coding, inverse quantization inverse transformation, de-blocking filtering and corresponding code stream writing on the current block to obtain the encoded current block.

In a third embodiment of the disclosure, based on the same principles as the in FIG. 1, FIG. 4 illustrates an apparatus 40 for determining an intra prediction mode according to the third embodiment of the present disclosure, the apparatus 40 comprises:

a picture evaluation module 401, configured to determine picture evaluation information of a to-be-encoded current block, and determine a plurality of picture evaluation information in one-to-one correspondence with a plurality of encoded reference blocks, wherein the pixel positions of the plurality of reference blocks are adjacent to the pixel position of the current block;

a reference block determination module 402, configured to calculate, based on the picture evaluation information of the current block and the picture evaluation information of the plurality of reference blocks, the correlation between the current block and each of the plurality of reference blocks respectively, and determine a target reference block in the plurality of reference blocks based on the results of the correlation calculations;

an intra prediction determination module 403, configured to perform a prediction search based on a first intra prediction mode of the target reference block, and determining a second intra prediction mode corresponding to the current block based on the result of the prediction search.

In some examples, the picture evaluation information comprises: gradient evaluation information.

Specifically, the picture evaluation module comprises:

a current block sub-module, configured to calculate single-frame gradient information of the current blocks in the multi-frame picture, respectively, and generating a set as the gradient evaluation information of the current block based on the single-frame gradient information of the plurality of current blocks corresponding to the multi-frame picture;

a reference block sub-module, configured to calculate, for any reference block, single-frame gradient information of the reference blocks in the multi-frame picture, respectively, and generating a set as the gradient evaluation information of the reference block based on the single-frame gradient information of the plurality of reference blocks corresponding to the multi-frame picture.

In some examples, the current block sub-module is specifically configured to:

for the current block in any frame, determine a first pixel gradient direction and a first pixel gradient modulus value of each of pixels in the current block;

determine a first average gradient direction based on the average direction of the first pixel gradient directions of the pixels, and determine a first average gradient modulus value based on the average value of the first pixel gradient modulus values of the pixels;

determine the single-frame gradient information of the current block based on the first average gradient direction and the first average gradient modulus value.

The reference block sub-module is specifically configured to:

for the reference block in any frame, determine a second pixel gradient direction and a second pixel gradient modulus value of each of pixels in the reference block;

determine a second average gradient direction based on the average direction of the second pixel gradient directions of the pixels, and determine a second average gradient modulus value based on the average value of the second pixel gradient modulus values of the pixels;

determine the single-frame gradient information of the reference block based on the second average gradient direction and the second average gradient modulus value.

In some examples, the current block sub-module, in the case of determining the single-frame gradient information of the current block based on the first average gradient direction and the first average gradient modulus value, is specifically configured to:

perform a normalization calculation based on the first average gradient direction and the first average gradient modulus value;

perform a weighted calculation based on the normalized first average gradient direction and the normalized first average gradient modulus value to obtain a weighted gradient value as the single-frame gradient information of the current block.

The reference block sub-module, in the case of determining the single-frame gradient information of the reference block based on the second average gradient direction and the second average gradient modulus value, is specifically configured to:

perform a normalization calculation based on the second average gradient direction and the second average gradient modulus value;

perform a weighted calculation based on the normalized second average gradient direction and the normalized second average gradient modulus value to obtain a weighted gradient value as the single-frame gradient information of the reference block.

In some examples, the reference block determination module is specifically configured to:

calculate, for any reference block, a Pearson correlation coefficient based on the picture evaluation information of the current block and the picture evaluation information of the reference block;

determine the corresponding reference block, with the largest value of Pearson correlation coefficient, as the target reference block.

In some examples, the reference block determination module, in the case of calculating, for any of the reference blocks, a Pearson correlation coefficient based on the picture evaluation information of the current block and the picture evaluation information of the reference block, is specifically configured to:

obtain, for any reference block, a covariance based on the picture evaluation information of the current block and the picture evaluation information of the reference block;

obtain a first standard deviation of the current block based on the picture evaluation information of the current block, and obtain a second standard deviation of the reference block based on the picture evaluation information of the reference block;

calculate the Pearson correlation coefficient between the current block and the reference block based on the covariance, the first standard deviation, and the second standard deviation.

In some examples, the number of the plurality of reference blocks is four.

The pixel positions of the plurality of reference blocks are adjacent to the pixel position of the current block, including: the four reference blocks are located at the left, the top, the left-top, and the right-top of the current block, respectively.

In some examples, the intra prediction determination module is specifically configured to:

take the prediction direction corresponding to the first intra prediction mode of the target reference block as the search reference direction, determine a plurality of intra prediction modes, whose prediction directions are closest to the search reference direction, as candidate intra prediction modes;

select, from the plurality of candidate intra prediction modes, the candidate intra prediction mode with the lowest rate distortion cost as the second intra prediction mode corresponding to the current block.

Figure 5:
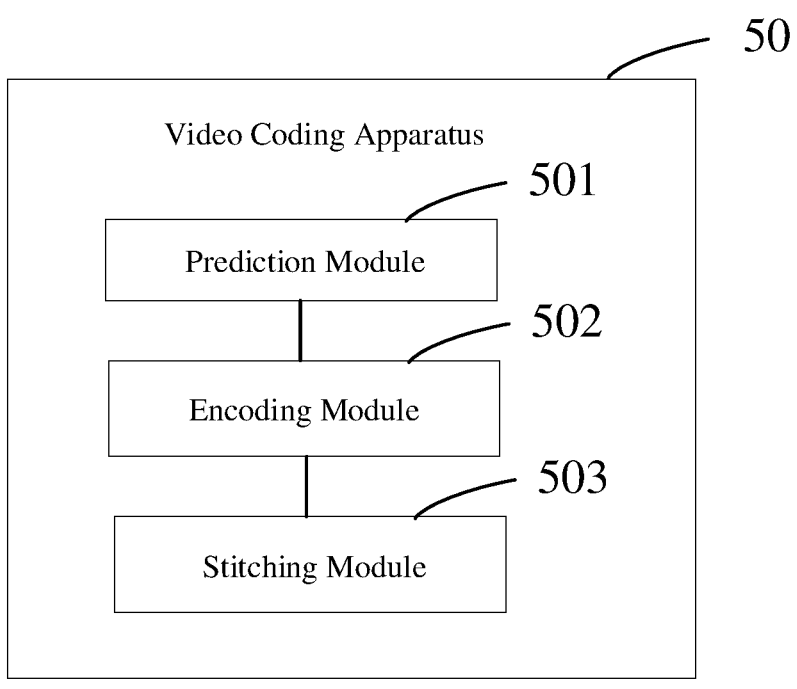
FIG. 5 illustrates a structural schematic diagram of a video coding apparatus according to a fourth embodiment of the present disclosure.

In a fourth embodiment of the disclosure, based on the same principles as FIG. 3, FIG. 5 illustrates a video coding apparatus 50 according to the fourth embodiment of the present disclosure, the apparatus 50 comprises:

a prediction module 501, configured to determine, for any to-be-encoded current block in a picture, a second intra prediction mode of the to-be-encoded current block;

an encoding module 502, configured to determine a final prediction mode of the to-be-encoded current block based on the second intra prediction mode, encode the current block based on the final prediction mode, and obtain an encoded current block;

a stitching module 503, configured to stitch each of the encoded current blocks to obtain a complete picture;

wherein the prediction module determines the second intra prediction mode of the to-be-encoded current block by the above method.

In some examples, the encoding module, in the case of determining, for any of the to-be-encoded current blocks in the picture, the final prediction mode of the to-be-encoded current block based on the second intra prediction mode, is configured to:

determine a inter prediction mode corresponding to the to-be-encoded current block;

compare the rate distortion cost of the second intra prediction mode and the inter prediction mode, and determine one of the second intra prediction mode and the inter prediction mode as the final prediction mode of the to-be-encoded current block based on the comparison result.

The collection, storage and application of the users' personal information involved in the technical solutions of the present disclosure are in compliance with relevant laws and regulations and do not violate public order and morals.

According to embodiments of the present disclosure, there is provided an electronic device, a readable storage medium and a computer program product.

Figure 6:
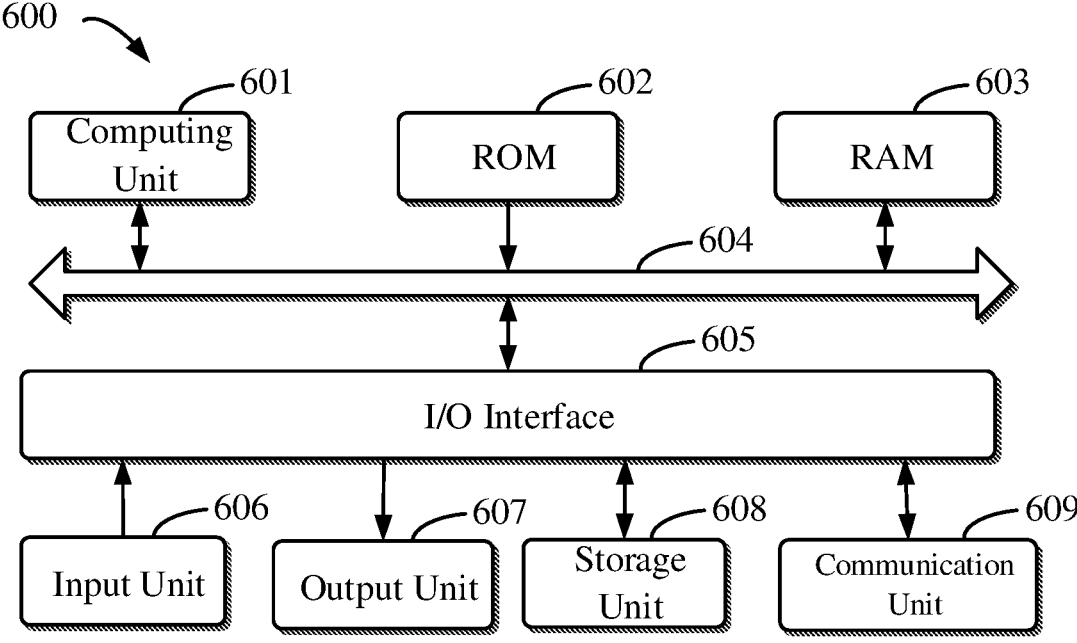
FIG. 6 illustrates a block diagram of an electronic device that can be used to implement the methods of embodiments of the present disclosure.

FIG. 6 illustrates an example block diagram of an example electronic device 600 that is used to implement the embodiments of the present disclosure. Electronic devices are intended to represent various forms of digital electronic computer devices, such as laptop computers, desktop computers, workstations, personal digital assistants, servers, blade servers, mainframe computers, and other suitable computers. The electronic devices may also represent various forms of mobile devices, such as personal digital processing, cellular telephones, smart phones, wearable devices, and other similar computing devices. The components shown herein, their connections and relationships, and their functions are merely as examples, and are not intended to limit the implementations of the disclosure described and/or claimed herein.

As shown in FIG. 6, the electronic device 600 includes a computing unit 601, which may perform various appropriate actions and processing according to a computer program stored in a read-only memory (ROM) 602 or a computer program loaded into a random access memory (RAM) 603 from a storage unit 608. In the RAM 603, various programs and data required by the operation of the electronic device 600 may also be stored. The computing unit 601, the ROM 602, and the RAM 603 are connected to each other through a bus 604. Input/output (I/O) interface 605 is also connected to the bus 604.

A plurality of components in the device 600 are connected to the I/O interface 605, including: an input unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, and the like. The communication unit 609 allows the device 600 to exchange information/data with other devices over a computer network such as the Internet and/or various telecommunication networks.

The computing unit 601 may be a variety of general and/or special purpose processing components with processing and computing capabilities. Some examples of the computing unit 601 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The computing unit 601 performs the various methods and processes described above, such as the method of determining an intra prediction mode and/or the video coding method. For example, in some embodiments, the method of determining an intra prediction mode and/or the video coding method may be implemented as a computer software program tangibly contained in a machine-readable medium, such as the storage unit 608. In some embodiments, part or all of the computer program may be loaded and/or installed onto the electronic device 600 via the ROM 602 and/or the communication unit 609. When the computer program is loaded into the RAM 603 and executed by the computing unit 601, one or more steps of the method of determining an intra prediction mode and/or the video coding method described above may be performed. Alternatively, in other embodiments, the computing unit 601 may be configured to perform the method of determining an intra prediction mode and/or the video coding method by any other suitable means (e.g., with the aid of firmware).

Various embodiments of the systems and techniques described above herein may be implemented in a digital electronic circuit system, an integrated circuit system, a field programmable gate array (FPGA), an application specific integrated circuit (ASIC), a dedicated standard product (ASSP), a system of system on a chip system (SoC), a complex programmable logic device (CPLD), computer hardware, firmware, software, and/or combinations thereof. These various embodiments may include: implementation in one or more computer programs that may be executed and/or interpreted on a programmable system including at least one programmable processor, where the programmable processor may be a dedicated or universal programmable processor that may receive data and instructions from a storage system, at least one input device, and at least one output device, and transmit data and instructions to the storage system, the at least one input device, and the at least one output device.

The program code for implementing the method of the present disclosure may be written in any combination of one or more programming languages. These program code may be provided to a processor or controller of a general-purpose computer, a special purpose computer, or other programmable data processing device such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium, which may contain or store a program for use by or in connection with an instruction execution system, device, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of a machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with a user, the systems and techniques described herein may be implemented on a computer having: a display device (e.g., a CRT (cathode ray tube) or an LCD (liquid crystal display) monitor) for displaying information to a user; and a keyboard and pointing device (e.g., a mouse or trackball) by which a user may provide input to the computer. Other types of devices may also be used to provide interaction with a user; for example, the feedback provided to the user may be any form of perception feedback (e.g., visual feedback, auditory feedback, or tactile feedback); and the input from the user may be received in any form (including acoustic input, voice input, or haptic input).

The systems and techniques described herein may be implemented in a computing system including a back-end component (e.g., as a data server), or a computing system including a middleware component (e.g., an application server), or a computing system including a front-end component (e.g., a user computer with a graphical user interface or a web browser, the user may interact with implementations of the systems and techniques described herein through the graphical user interface or the web browser), or in a computing system including any combination of such back-end components, middleware components, or front-end components. The components of the system may be interconnected by digital data communication (e.g., a communications network) in any form or medium. Examples of communication networks include a local area network (LAN), a wide area network (WAN), the Internet, and a blockchain network.

The computer system may include a client and a server. Clients and servers are generally remote from each other and typically interact through a communication network. The relationship between clients and servers is generated by computer programs running on respective computers and having a client-server relationship to each other. The server may be a cloud server, or may be a server of a distributed system, or a server incorporating a blockchain.

It should be understood that the various forms of processes shown above may be used, and the steps may be reordered, added, or deleted. For example, the steps described in the present disclosure may be performed in parallel or sequentially or in a different order, as long as the results expected by the technical solutions disclosed in the present disclosure can be achieved, and no limitation is made herein.

The above specific embodiments do not constitute a limitation on the scope of protection of the present disclosure. Those skilled in the art should understand that various modifications, combinations, sub-combinations, and substitutions may be made according to design requirements and other factors. Any modification, equivalent replacement and improvement made within the spirit and principle of the present disclosure shall be included in the protection scope of the present disclosure.

The invention claimed is:

1. A method, comprising:

determining picture evaluation information of a current block to be encoded, wherein the picture evaluation information comprises gradient evaluation information, wherein the determining the picture evaluation information of the current block to be encoded comprises:

calculating single-frame gradient information of the current block in each single-frame of multiple frames, respectively; and generating a set as the gradient evaluation information of the current block based on the single-frame gradient information of the current block in each single-frame of the multiple frames;

determining, for each reference block of a plurality of reference blocks that are encoded, picture evaluation information of the reference block, wherein pixel positions of the plurality of reference blocks are adjacent to a pixel position of the current block, wherein the determining, for each reference block of the plurality of reference blocks that are encoded, the picture evaluation information of the reference block comprises:

for each reference block in the plurality of reference blocks, calculating single-frame gradient information of the reference block in each single-frame of the multiple frames, respectively; and generating a set as the gradient evaluation information of the reference block based on the single-frame gradient information of the plurality of reference blocks in each single-frame of the multiple frames;

calculating, based on the picture evaluation information of the current block and the picture evaluation information of the plurality of reference blocks, a correlation between the current block and each reference block of the plurality of reference blocks, respectively;

determining a target reference block in the plurality of reference blocks based on the calculating the correlation between the current block and each reference block of the plurality of reference blocks, respectively; and performing a prediction search based on a first intra prediction mode of the target reference block, and determining a second intra prediction mode corresponding to the current block based on a result of performing the prediction search, wherein the performing the prediction search based on the first intra prediction mode of the target reference block, and determining the second intra prediction mode corresponding to the current block based on the result of performing the prediction search comprises:

determining a plurality of intra prediction modes whose corresponding prediction directions are closest to a search reference direction as a plurality of candidate intra prediction modes, wherein a prediction direction corresponding to the first intra prediction mode of the target reference block is the search reference direction; and selecting, from the plurality of candidate intra prediction modes, the candidate intra prediction mode with a lowest rate distortion cost as the second intra prediction mode corresponding to the current block.

2. The method of claim 1, wherein the calculating the single-frame gradient information of the current block in each single-frame of the multiple frames, respectively, comprises:

for the current block in each single-frame of the multiple frames, determining, for each pixel in the current block, a first pixel gradient direction and a first pixel gradient modulus value of the pixel;

determining a first average gradient direction based on an average direction of the first pixel gradient directions of the pixels in the current block, and determining a first average gradient modulus value based on an average value of the first pixel gradient modulus values of the pixels in the current block; and determining the single-frame gradient information of the current block in the single-frame based on the first average gradient direction and the first average gradient modulus value; and wherein the calculating, for each reference block in the plurality of reference blocks, the single-frame gradient information of the reference block in each single-frame of the multiple frames, respectively, comprises:

for the reference block in each single-frame of the multiple frames, determining, for each pixel in the reference block, a second pixel gradient direction and a second pixel gradient modulus value of the pixel;

determining a second average gradient direction based on an average direction of the second pixel gradient directions of the pixels in the reference block, and determining a second average gradient modulus value based on an average value of the second pixel gradient modulus values of the pixels in the reference block; and determining the single-frame gradient information of the reference block in the single-frame based on the second average gradient direction and the second average gradient modulus value.

3. The method of claim 2, wherein the determining the single-frame gradient information of the current block in the single-frame based on the first average gradient direction and the first average gradient modulus value comprises:

performing a normalization calculation based on the first average gradient direction and the first average gradient modulus value; and performing a weighted calculation based on the normalized first average gradient direction and the normalized first average gradient modulus value to obtain a weighted gradient value as the single-frame gradient information of the current block in the single-frame; and wherein the determining the single-frame gradient information of the reference block in the single-frame based on the second average gradient direction and the second average gradient modulus value comprises:

performing a normalization calculation based on the second average gradient direction and the second average gradient modulus value; and performing a weighted calculation based on the normalized second average gradient direction and the normalized second average gradient modulus value to obtain a weighted gradient value as the single-frame gradient information of the reference block in the single-frame.

4. The method of claim 1, wherein the calculating the correlation between the current block and each reference block of the plurality of reference blocks, respectively, comprises:

calculating, for each reference block of the plurality of reference blocks, a Pearson correlation coefficient based on the picture evaluation information of the current block and the picture evaluation information of the reference block; and wherein the determining the target reference block in the plurality of reference blocks comprises:

determining the reference block with a largest value of the Pearson correlation coefficient as the target reference block.

5. The method of claim 4, wherein the calculating, for each reference block of the plurality of reference blocks, the Pearson correlation coefficient based on the picture evaluation information of the current block and the picture evaluation information of the reference block comprises:

obtaining a covariance based on the picture evaluation information of the current block and the picture evaluation information of the reference block;

obtaining a first standard deviation of the current block based on the picture evaluation information of the current block;

obtaining a second standard deviation of the reference block based on the picture evaluation information of the reference block; and calculating the Pearson correlation coefficient between the current block and the reference block based on the covariance, the first standard deviation, and the second standard deviation.

6. The method of claim 1, wherein a number reference blocks in the plurality of reference blocks is four reference blocks; and wherein the four reference blocks are located at a left, a top, a left-top, and a right-top of the current block, respectively.

7. A video coding method, comprising:

for each current block to be encoded of a plurality of current blocks to be encoded in a frame:

determining a second intra prediction mode of the current block to be encoded;

determining a final prediction mode of the current block to be encoded based on the second intra prediction mode; and encoding the current block based on the final prediction mode to obtain an encoded current block; and stitching the encoded current blocks in the frame to obtain a complete frame;

wherein the second intra prediction mode of the current block to be encoded is determined based on:

determining picture evaluation information of a current block to be encoded, wherein the picture evaluation information comprises gradient evaluation information, wherein the determining the picture evaluation information of the current block to be encoded comprises:

calculating single-frame gradient information of the current block in each single-frame of multiple frames, respectively; and generating a set as the gradient evaluation information of the current block based on the single-frame gradient information of the current block in each single-frame of the multiple frames;

determining, for each reference block of a plurality of reference blocks that are encoded, picture evaluation information of the reference block, wherein pixel positions of the plurality of reference blocks are adjacent to a pixel position of the current block, wherein the determining, for each reference block of the plurality of reference blocks that are encoded, the picture evaluation information of the reference block comprises:

for each reference block in the plurality of reference blocks, calculating single-frame gradient information of the reference block in each single-frame of the multiple frames, respectively; and generating a set as the gradient evaluation information of the reference block based on the single-frame gradient information of the plurality of reference blocks in each single-frame of the multiple frames;

calculating, based on the picture evaluation information of the current block and the picture evaluation information of the plurality of reference blocks, a correlation between the current block and each reference block of the plurality of reference blocks, respectively;

determining a target reference block in the plurality of reference blocks based on the calculating the correlation between the current block and each reference block of the plurality of reference blocks, respectively; and performing a prediction search based on a first intra prediction mode of the target reference block, and determining a second intra prediction mode corresponding to the current block based on a result of performing the prediction search, wherein the performing the prediction search based on the first intra prediction mode of the target reference block, and determining the second intra prediction mode corresponding to the current block based on the result of performing the prediction search comprises:

determining a plurality of intra prediction modes whose corresponding prediction directions are closest to a search reference direction as a plurality of candidate intra prediction modes, wherein a prediction direction corresponding to the first intra prediction mode of the target reference block is the search reference direction; and selecting, from the plurality of candidate intra prediction modes, the candidate intra prediction mode with a lowest rate distortion cost as the second intra prediction mode corresponding to the current block.

8. The method of claim 7, wherein the determining the final prediction mode of the current block to be encoded based on the second intra prediction mode comprises:

determining an inter prediction mode corresponding to the current block to be encoded; and determining one of the second intra prediction mode and the inter prediction mode corresponding to the current block to be encoded as the final prediction mode of the current block to be encoded by comparing a rate distortion cost of the second intra prediction mode and the inter prediction mode.

22

9. An electronic device, comprising:
at least one processor; and
a memory communicatively connected to the at least one processor; wherein the memory stores instructions executable by the at least one processor, and the instructions executed by the at least one processor enable the at least one processor to execute operations comprising:

determining picture evaluation information of a current block to be encoded, wherein the picture evaluation information comprises gradient evaluation information, wherein the determining the picture evaluation information of the current block to be encoded comprises:

calculating single-frame gradient information of the current block in each single-frame of multiple frames, respectively; and generating a set as the gradient evaluation information of the current block based on the single-frame gradient information of the current block in each single-frame of the multiple frames;

determining, for each reference block of a plurality of reference blocks that are encoded, picture evaluation information of the reference block, wherein pixel positions of the plurality of reference blocks are adjacent to a pixel position of the current block, wherein the determining, for each reference block of the plurality of reference blocks that are encoded, the picture evaluation information of the reference block comprises:

for each reference block in the plurality of reference blocks, calculating single-frame gradient information of the reference block in each single-frame of the multiple frames, respectively; and generating a set as the gradient evaluation information of the reference block based on the single-frame gradient information of the plurality of reference blocks in each single-frame of the multiple frames;

calculating, based on the picture evaluation information of the current block and the picture evaluation information of the plurality of reference blocks, a correlation between the current block and each reference block of the plurality of reference blocks, respectively;

determining a target reference block in the plurality of reference blocks based on the calculating the correlation between the current block and each reference block of the plurality of reference blocks, respectively; and performing a prediction search based on a first intra prediction mode of the target reference block, and determining a second intra prediction mode corresponding to the current block based on a result of performing the prediction search, wherein the performing the prediction search based on the first intra prediction mode of the target reference block, and determining the second intra prediction mode corresponding to the current block based on the result of performing the prediction search comprises:

determining a plurality of intra prediction modes whose corresponding prediction directions are closest to a search reference direction as a plurality of candidate intra prediction modes, wherein a prediction direction corresponding to the first intra prediction mode of the target reference block is the search reference direction; and selecting, from the plurality of candidate intra prediction modes, the candidate intra prediction mode with a lowest rate distortion cost as the second intra prediction mode corresponding to the current block.

10. The electronic device of claim 9, wherein the calculating the single-frame gradient information of the current block in each single-frame of the multiple frames, respectively, comprises:

for the current block in each single-frame of the multiple frames, determining, for each pixel in the current block, a first pixel gradient direction and a first pixel gradient modulus value of the pixel;

determining a first average gradient direction based on an average direction of the first pixel gradient directions of the pixels in the current block, and determining a first average gradient modulus value based on an average value of the first pixel gradient modulus values of the pixels in the current block; and determining the single-frame gradient information of the current block in the single-frame based on the first average gradient direction and the first average gradient modulus value; and wherein the calculating, for each reference block in the plurality of reference blocks, the single-frame gradient information of the reference block in each single-frame of the multiple frames, respectively, comprises:

for the reference block in each single-frame of the multiple frames, determining, for each pixel in the reference block, a second pixel gradient direction and a second pixel gradient modulus value of the pixel;

determining a second average gradient direction based on an average direction of the second pixel gradient directions of the pixels in the reference block, and determining a second average gradient modulus value based on an average value of the second pixel gradient modulus values of the pixels in the reference block; and determining the single-frame gradient information of the reference block in the single-frame based on the second average gradient direction and the second average gradient modulus value.

11. The electronic device of claim 10, wherein the determining the single-frame gradient information of the current block in the single-frame based on the first average gradient direction and the first average gradient modulus value comprises:

performing a normalization calculation based on the first average gradient direction and the first average gradient modulus value; and performing a weighted calculation based on the normalized first average gradient direction and the normalized first average gradient modulus value to obtain a weighted gradient value as the single-frame gradient information of the current block in the single-frame; and wherein the determining the single-frame gradient information of the reference block in the single-frame based on the second average gradient direction and the second average gradient modulus value comprises:

performing a normalization calculation based on the second average gradient direction and the second average gradient modulus value; and performing a weighted calculation based on the normalized second average gradient direction and the normalized second average gradient modulus value to obtain a weighted gradient value as the single-frame gradient information of the reference block in the single-frame.

12. The electronic device of claim 9, wherein the calculating the correlation between the current block and each reference block of the plurality of reference blocks, respectively, comprises:

calculating, for each reference block of the plurality of reference blocks, a Pearson correlation coefficient based on the picture evaluation information of the current block and the picture evaluation information of the reference block; and wherein the determining the target reference block in the plurality of reference blocks comprises:

determining the reference block with a largest value of the Pearson correlation coefficient as the target reference block.

13. The electronic device of claim 12, wherein the calculating, for each reference block of the plurality of reference blocks, the Pearson correlation coefficient based on the picture evaluation information of the current block and the picture evaluation information of the reference block comprises:

obtaining, a covariance based on the picture evaluation information of the current block and the picture evaluation information of the reference block;

obtaining a first standard deviation of the current block based on the picture evaluation information of the current block;

obtaining a second standard deviation of the reference block based on the picture evaluation information of the reference block; and calculating the Pearson correlation coefficient between the current block and the reference block based on the covariance, the first standard deviation, and the second standard deviation.

14. The electronic device of claim 9, wherein a number reference blocks in the plurality of reference blocks is four reference blocks; and wherein the four reference blocks are located at a left, a top, a left-top, and a right-top of the current block, respectively.

* * * * *